C. M. LEFKOWITZ.
INSULATING CAP FOR CONDUITS.
APPLICATION FILED JUNE 24, 1916.
1,231,273.
Patented June 26, 1917.
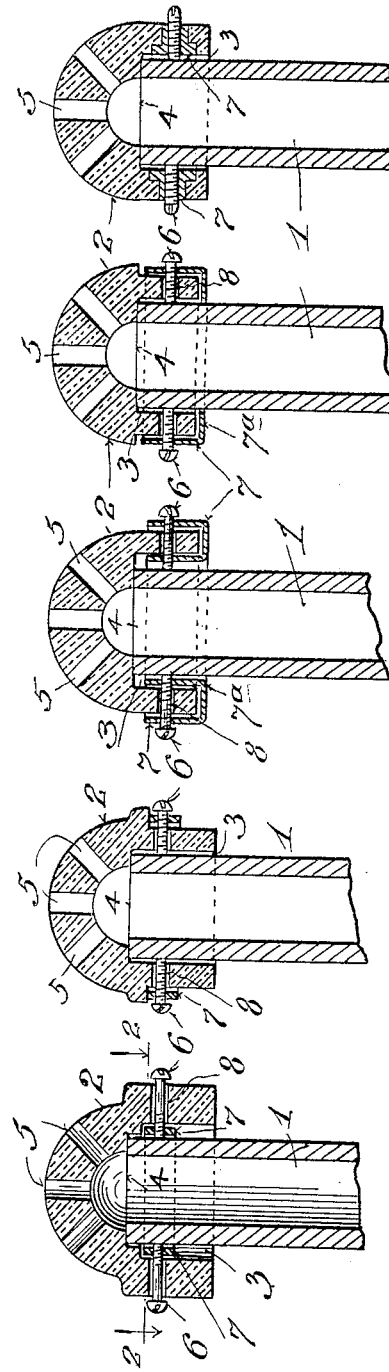
Inventor
Chas M. Lefkowitz
By his Attorney
P. F. Bourne

UNITED STATES PATENT OFFICE.

CHARLES M. LEFKOWITZ, OF NEW YORK, N. Y.

INSULATING-CAP FOR CONDUITS.

1,231,273.

Specification of Letters Patent.

Patented June 26, 1917.

Application filed June 24, 1916. Serial No. 105,635.

*To all whom it may concern:*

Be it known that I, CHARLES M. LEFKOWITZ, a citizen of the United States, and resident of New York city, borough of Manhattan, in the county of New York and State of New York, have invented certain new and useful Improvements in Insulating-Caps for Conduits, of which the following is a specification.

The object of my invention is to provide an insulating cap through which electric wires are adapted to pass, with simple and efficient means to attach said cap to an electric conduit, armored conductor or the like.

My invention comprises a perforated insulating cap having a recess to receive an end of the conduit, armored conductor or the like, and provided with means to support one or more screws adapted to be screwed against the conduit or the like for securing the cap thereto.

My invention further comprises novel details of improvement and combinations of parts that will be more fully hereinafter set forth and then pointed out in the claims.

Reference is to be had to the accompanying drawings forming part thereof, wherein, Figure 1 is a central sectional view illustrating my improvements on a conduit, the screw-supporting means being within the insulating cap;

Fig. 2 is a cross section on the line 2, 2, in Fig. 1;

Fig. 3 is a view similar to Fig. 1 illustrating the screw-supporting ring on the exterior of the cap;

Figs. 4, 5, 6 and 7 are sectional views illustrating other forms of my improvements; Fig. 7ª is a section of Fig. 7.

Similar numerals of reference indicate corresponding parts in the several views.

At 1 is indicated a conduit for electric wires and at 2 is a cap of suitable insulating material adapted to fit upon such conduit. The cap is shown provided with a recess 3 to receive the conduit, and having a seat or abutment 4 against which the end of the conduit may abut. Cap 2 is provided with any desired number of perforations 5 for the passage through the cap of electric conductors from within the conduit. 6 indicates screws carried by the cap adapted to bear against the conduit to retain the cap thereon. At 7 is a member threaded to receive one or more screws, being shown in Figs. 1 to 6 in the form of a ring adapted to encircle the conduit. The screws are shown passing through laterally disposed apertures 8 in the side wall of the cap, whereby with one or more screws in the threaded aperture or apertures of the ring the latter will be retained upon the cap. In Figs. 1 and 2 ring 7 is shown located within the recess 3 of the cap to directly encircle the conduit, screws passing through the apertures or perforations 8 of the caps into the ring against the conduit. In Fig. 3 the ring 7 is shown encircling the cap and the screws pass from the ring through the perforations 8 in the cap against the conduit.

In Fig. 4 the ring 7 has two annular members, one within the recess of the cap and the other surrounding the cap, said members being connected together by a transverse web 7ª, the screws passing through the perforations 8 in the cap and preferably threaded in both ring members. With this form the lower edge of the cap is guarded and protected, and the tension of the screw on the ring when the screw bears against the conduit is entirely taken from the cap.

In Fig. 5 the ring 7 is shown on the exterior of the cap and the web 7ª extends below the cap, the web 7ª serving to protect the lower edge of the cap.

In Fig. 6 the ring 7 is shown within the cap and is set in a recess 9 therein. In this form the ring may be embedded in the material of the cap when the latter is formed, as for instance by molding such material around the ring, and the screw or screws 6 pass through the apertures or perforations 8 in the cap and in the threaded aperture or apertures of the ring to bear against the conduit, as before described.

In Figs. 7 and 7ª the threaded members 7 are in separate pieces each embedded in the material of the cap, and are shown provided with inner flanged or enlarged portions, the outer ends of the members opening through the outer wall of the cap and receiving the screws 6.

In all the forms of my invention set forth, it is merely necessary to pass the electric wires through the perforations 5 of the cap, push the cap over the end of the conduit, and then set the screw or screws firmly against the conduit, whereby the cap will be retained securely in position on the conduit. Since the screws are free in their respective perforations in the cap and are threaded in the annular member or ring 7, retaining tension of screws against insulation, such as porcelain, is overcome, thereby reducing danger of breakage of the insulating caps. Furthermore, since the screws are retained on the conduit by the annular member or ring 7 independent of the cap, and since the screws may pass freely through perforations in the cap, the latter is mounted with freedom on the conduit so that the cap may have movement relatively to the conduit, while still being securely retained thereon by the screws, to accommodate the cap to the conductors passing through the perforations or apertures 5.

While I have illustrated two screws in connection with ring-like member 7 it will be understood that one or more screws may be used as preferred. In the form shown in Figs. 1 and 4 a single screw will draw the ring member against the conduit, keeping the walls of the cap out of engagement therewith, but by having two or more screws the ring member also may be kept out of contact with the conduit. In the form shown in Figs. 3, 5, 6, and 7 by using two or more screws they may be so set upon the conduit as to keep the material of the cap out of engagement with the conduit, thereby to overcome danger of injury to the cap by forcing it against the conduit, particularly where the cap is made of friable material, such as porcelain or glass.

Although I have illustrated the conduit in the form of a tube adapted to receive one or more conductors, such as an electric cable, it will be understood that my improvements are adapted to be applied upon armored conductors, flexible or spirally wound conduits, metal moldings, and the like, and by the term "conduit" herein I intend to include all such elements.

Having now described my invention what I claim is:

1. A device of the class described comprising an insulating perforated cap adapted to fit upon a conduit, a screw and means separate from the material of the cap to support the screw upon the cap to enable the screw to bear against the outer surface of a conduit.

2. A device of the class described comprising an insulating perforated cap adapted to fit upon a conduit, a screw, the cap having an aperture freely receiving the screw, and means separate from the material of the cap to retain the screw in the aperture to bear against a conduit.

3. A device of the class described comprising an insulating perforated cap adapted to fit upon a conduit, a screw, and an annular member adapted to encircle the conduit, said screw being threaded in said member to press against the conduit, the screw being located in an aperture in the cap and unthreaded in the latter.

4. A device of the class described comprising an insulating perforated cap adapted to fit upon a conduit, a screw, an annular member adapted to encircle the conduit, said cap having an aperture, the screw being loosely located in the aperture and threaded in the member to bear against a conduit.

5. A device of the class described comprising an insulating perforated cap provided with a recess opposite the perforations to receive a conduit, an annular member within the recess adapted to encircle the conduit, and a screw passing through the cap and threaded in said member to bear against a conduit.

6. A device of the class described comprising an insulating perforated cap provided with a recess opposite the perforations to receive a conduit, an annular member concentric with the cap and having a web extending along an edge of the cap, and a screw passing through the cap and threaded in the member to bear against a conduit.

7. A device of the class described comprising an insulating perforated cap provided with a recess opposite the perforations to receive a conduit, an annular member having a portion within and a portion without the cap, and a screw passing through the cap and threaded in said portions of said member to bear against a conduit.

8. A device of the class described comprising an insulating perforated cap provided with a recess opposite the perforations to receive a conduit, an annular member having a portion within and a portion without the cap, said portions of the annular member having a transverse web connecting them and extending along an edge of the cap, and a screw passing through the cap and threaded in said portions of said member to bear against a conduit.

Signed at New York city, in the county of New York, and State of New York, this 23rd day of June, A. D. 1916.

CHARLES M. LEFKOWITZ.

Witnesses:
MARIE F. WAINRIGHT,
T. F. BOURNE.

Copies of this patent may be obtained for five cents each, by addressing the "Commissioner of Patents, Washington, D. C."